(12) United States Patent
Wei

(10) Patent No.: US 8,226,281 B2
(45) Date of Patent: Jul. 24, 2012

(54) MULTI-FUNCTIONAL LAMP

(76) Inventor: Ho-Sheng Wei, Taipei Hsien (TW)

( * ) Notice: Subject to any disclaimer, the term of this patent is extended or adjusted under 35 U.S.C. 154(b) by 463 days.

(21) Appl. No.: 12/639,502

(22) Filed: Dec. 16, 2009

(65) Prior Publication Data
US 2011/0141751 A1    Jun. 16, 2011

(51) Int. Cl.
*B60Q 1/06* (2006.01)
*F21V 33/00* (2006.01)
(52) U.S. Cl. ........ 362/430; 362/475; 362/418; 362/285; 362/249.03
(58) Field of Classification Search .................. 362/428, 362/418, 430, 285, 287, 190, 191, 197, 198, 362/396, 473, 474, 475, 476, 103, 249.03, 362/249.07, 249.1, 249.11
See application file for complete search history.

(56) References Cited

U.S. PATENT DOCUMENTS

| | | | | |
|---|---|---|---|---|
| 2,287,874 | A * | 6/1942 | Gibbons et al. ............... | 362/396 |
| 5,446,441 | A * | 8/1995 | Su ................................. | 362/486 |
| 5,921,669 | A * | 7/1999 | Taylor et al. .................. | 362/476 |
| 6,227,688 | B1 * | 5/2001 | Taylor et al. .................. | 362/473 |
| 7,572,024 | B2 * | 8/2009 | Ko et al. .......................... | 362/92 |
| 7,594,741 | B2 * | 9/2009 | Okajima et al. ................ | 362/473 |
| 2006/0158875 | A1 * | 7/2006 | LeBlanc et al. ............... | 362/191 |
| 2009/0135619 | A1 * | 5/2009 | Hung ............................ | 362/474 |

* cited by examiner

*Primary Examiner* — Bao Q Truong
(74) *Attorney, Agent, or Firm* — Chun-Ming Shih; HDLS IPR Services

(57) ABSTRACT

A multi-functional lamp includes a carrier module, a rotating element, a light emitting module, a compressing mechanism and an elastic clamp mechanism. The carrier module includes a base and a curved arm coupled to the base. The base includes a shaft protruded thereon, and the rotating element is pivotally coupled to the shaft, and the light emitting module is coupled to the rotating element, and the compressing mechanism is pivotally coupled to the curved arm and enclosed with the curved arm to form a containing groove, and the elastic clamp mechanism includes an elastic element, such that the lamp can be installed on a bicycle or worn on a user's body to provide active illumination for a dark place with insufficient light and an illumination angle of the lamp can be adjusted to illuminate a target area.

10 Claims, 14 Drawing Sheets

MULTI-FUNCTIONAL LAMP

BACKGROUND OF THE INVENTION

1. Field of the Invention

The present invention relates to a lamp, and more particularly to a multi-functional lamp capable of adjusting its illumination angle.

2. Description of Prior Art

Since people pay more and more attention to leisure activities, particularly to mild fitness exercises such as bicycle riding and jogging, as well as the concept of environmental protection arising from energy crisis and increasingly higher oil price, and bicycles consume no petroleum and cause no noise or pollution, therefore bicycles not just serve as a fitness equipment, but also provide a transportation means for commuters. In general, a bicycle usually comes with a passive reflective plate installed at the rear of the bicycle to reflect the light of a coming motor vehicle behind the bicycle, and the bicycle usually has no active illumination lamp, and thus it is relatively a high risk to ride the bicycle in a dark place. If a rider rides the bicycle on a rough road with obstacles and is not familiar with the road conditions, or even worse, there is a cliff in the front, it will be very dangerous and even fatal to ride the bike without having sufficient light and knowing the road conditions ahead. In the morning or at nighttime, it is also dangerous for joggers to jog or pedestrians to walk on a road since drivers cannot see the joggers or pedestrians easily in the dark, and thus the pedestrians or joggers usually wear a reflective ring to reflect the light from the motor vehicle to warn the drivers. However, the reflective plates or reflective rings are passive warning devices and cannot emit light, so that these devices can provide a low safety effect, and accidents may occur easily.

SUMMARY OF THE INVENTION

Therefore, it is a primary objective of the present invention to provide a multi-functional lamp installed on a bicycle or worn by a user for supplying an illumination in a dark place, and an illumination angle of the lamp can be adjusted for illuminating a target area.

To achieve the foregoing objective, the present invention provides a multi-functional lamp, comprising:

a carrier module, including a base and a curved arm coupled to a side of the base, and the base having a shaft formed thereon, and the curved arm having a front through hole and a rear through hole formed thereon;

a rotating element, having a cam shaft pivotally coupled to the shaft;

a light emitting module, including a body coupled to the rotating element and a light emitting member installed at the body; and a compressing mechanism, including a rotating arm, a fastener module, a first pivot and a second pivot, wherein the first pivot is passed through the front through hole and coupled to the rotating arm, and the second pivot is passed through the rear through hole and coupled to the fastener module, and the fastener module is embedded and fixed into the rotating arm, and the rotating arm and the curved arm are enclosed to form a containing groove.

The multi-functional lamp of the present invention can be installed onto a bicycle to achieve the effect of providing an active illumination at nighttime or in a dark place such as a tunnel or a forest trail, and the light emitting module illuminates the front to provide a clear driving direction to a bicycle rider, and the light emitting module can be rotated downward to illuminate the ground in order to avoid obstacles, pits or height difference of the road, and the multi-functional lamp can be worn onto a user's body or clamped onto a waist belt or a hat to provide illuminations for pedestrians, so as to prevent the pedestrians from tumbling or falling into a trap.

DETAILED DESCRIPTION OF THE INVENTION

The technical characteristics, features and advantages of the present invention will become apparent in the following detailed description of the preferred embodiments with reference to the accompanying drawings. The drawings are provided for reference and illustration only, but not intended for limiting the present invention.

Figure 1:
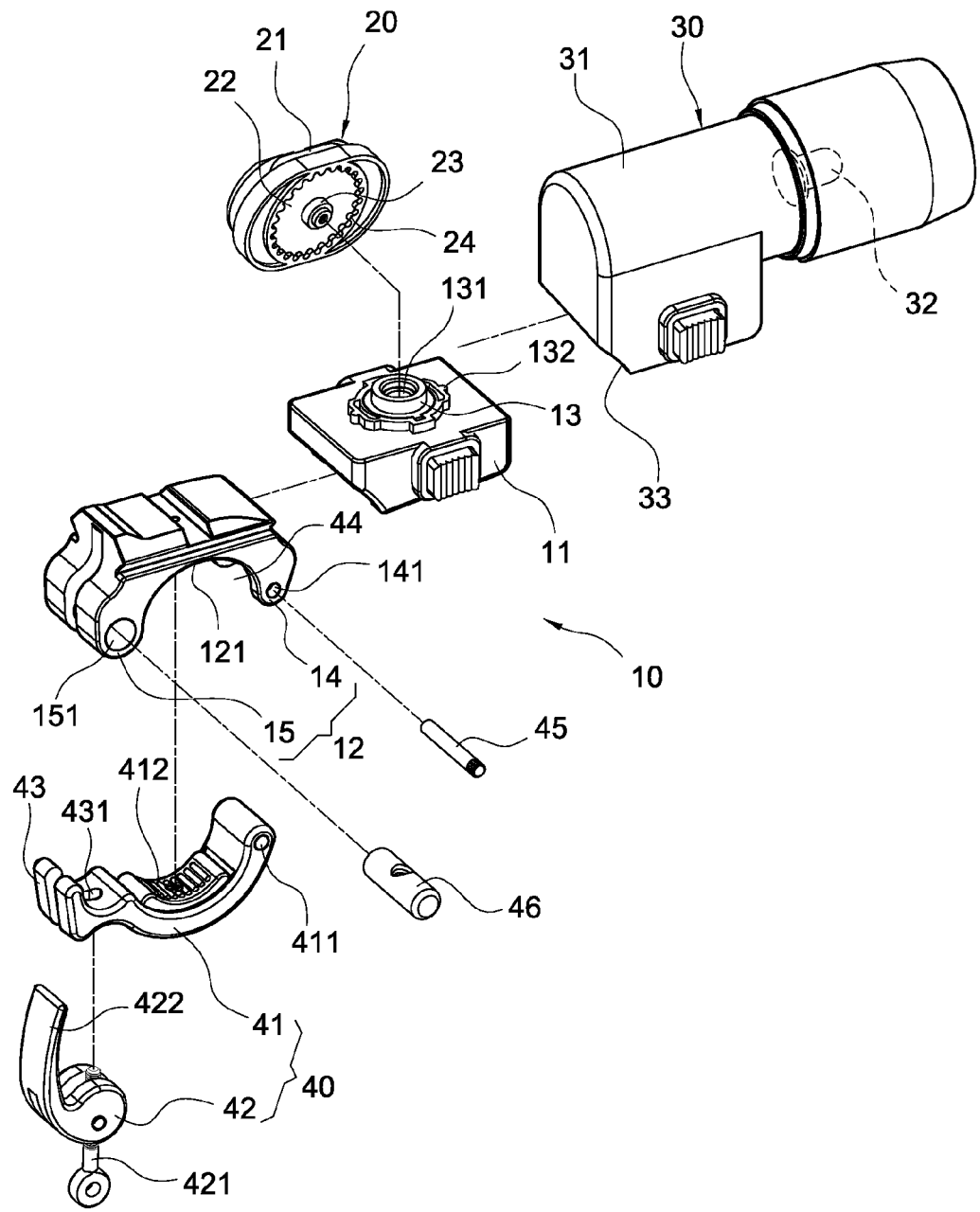
FIG. 1 is an exploded view of a first preferred embodiment of the present invention.
Figure 2:
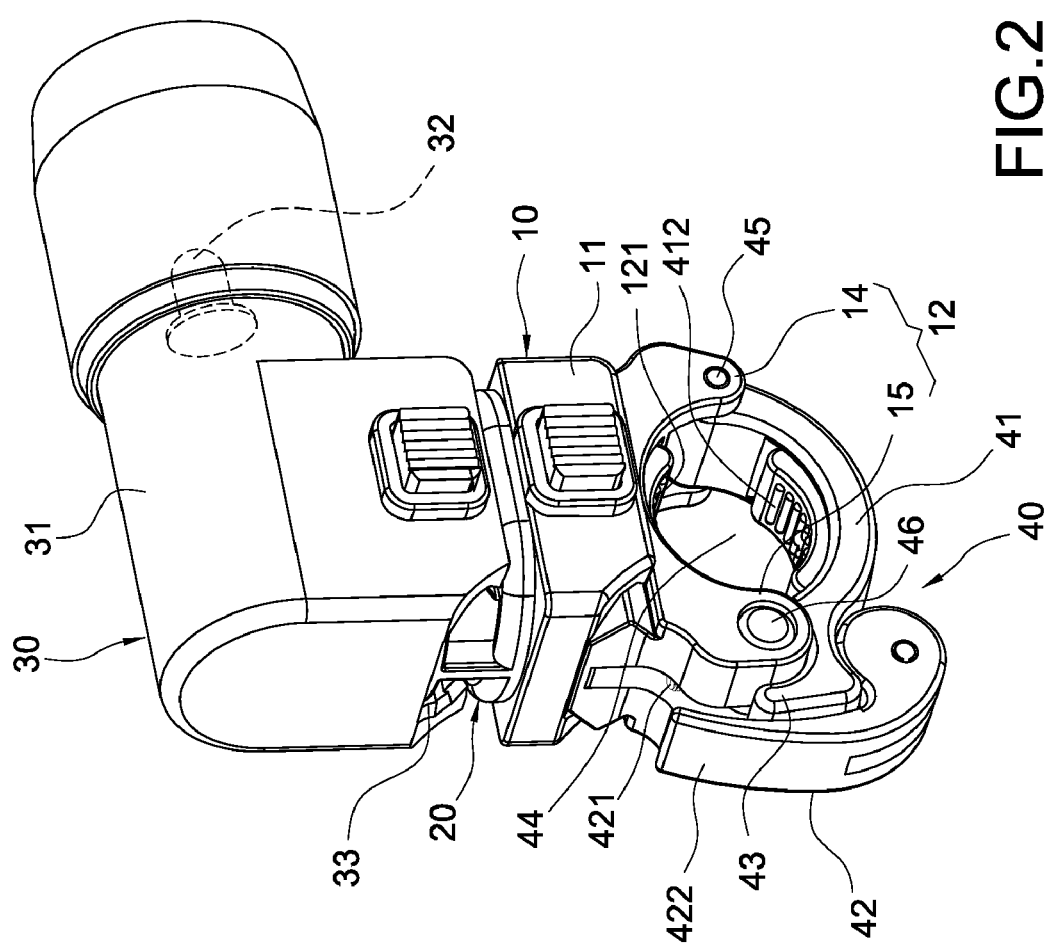
FIG. 2 is a perspective view of a first preferred embodiment of the present invention.

With reference to FIGS. 1 and 2 for a first preferred embodiment of a multi-functional lamp of the present invention, the multi-functional lamp comprises a carrier module 10, a rotating element 20, a light emitting module 30, and a compressing mechanism 40.

The carrier module 10 includes a base 11 and a curved arm 12 coupled to a side of the base 11, wherein a shaft 13 is formed and protruded from a surface of the base 11, and the shaft 13 has a shaft hole 131, and the shaft 13 includes an outer gear 132 protruded from the periphery of the shaft 13, and the curved arm 12 includes a front arm 14 and a rear arm 15, and the front arm 14 has a front through hole 141, and the rear arm 15 includes a rear through hole 151, and the curved arm 12 includes a lower curved gear rack 121 protruded from the center of a surface of the curved arm 12.

The rotating element 20 includes a pair of guide rails 21 formed on both sides of the rotating element 20 respectively, an inner groove 22 concavely formed at the bottom of the rotating element 20, a cam shaft 23 protruded from a bottom side of the inner groove 22, and a circular inner gear 24 protruded from an internal wall of the inner groove 22, wherein the rotating element 20 is pivotally coupled into the shaft hole 131 through the cam shaft 23, and the circular inner gear 24 is engaged with the outer gear 132, and the rotating element 20 is coupled to the base 11 by a screw or any other locking method, such that the rotating element 20 will not be separated from the shaft 13.

The light emitting module 30 includes a body 31 and a light emitting member 32 installed at the body 31, and a pair of pair of guide slots 33 protruded from the bottom of the body 31 and latched with the pair of guide rails 21 respectively, such that the light emitting module 30 is slidably coupled onto the rotating element 20.

The compressing mechanism 40 includes a rotating arm 41, a fastener module 42, a first pivot 45 and a second pivot 46, wherein a penetrating hole 411 is formed at a front end of the rotating arm 41, and the rotating arm 41 is passed through the front through hole 141 and the penetrating hole 411 by the first pivot 45, so that the rotating arm 41 is pivotally coupled to the front arm 14, and an upper curved gear rack 412 is protruded from an internal wall of the rotating arm 41, and a hook 43 is extended from a rear end of the rotating arm 41, and an embedding groove 431 is formed at the center of the hook 43, and the hook 43 is provided for clamping and pressing the rear arm 15, and the rotating arm 41 and the curved arm 12 are enclosed to form a containing groove 44.

The fastener module 42 includes an embedded rod 421 coupled to the second pivot 46 and a quick release handle 422 coupled to the embedded rod 421, and the embedded rod 421 is coupled onto the second pivot 46 by a screw or any other locking method, and the fastener module 42 is passed through the rear through hole 151 by the second pivot 46, such that the fastener module 42 is pivotally coupled to the rear arm 15, and the embedded rod 421 is embedded into the embedding groove 431, and the quick release handle 422 is pressed against the hook 43, and the hook 43 abuts against the rear arm 15.

Figure 3:
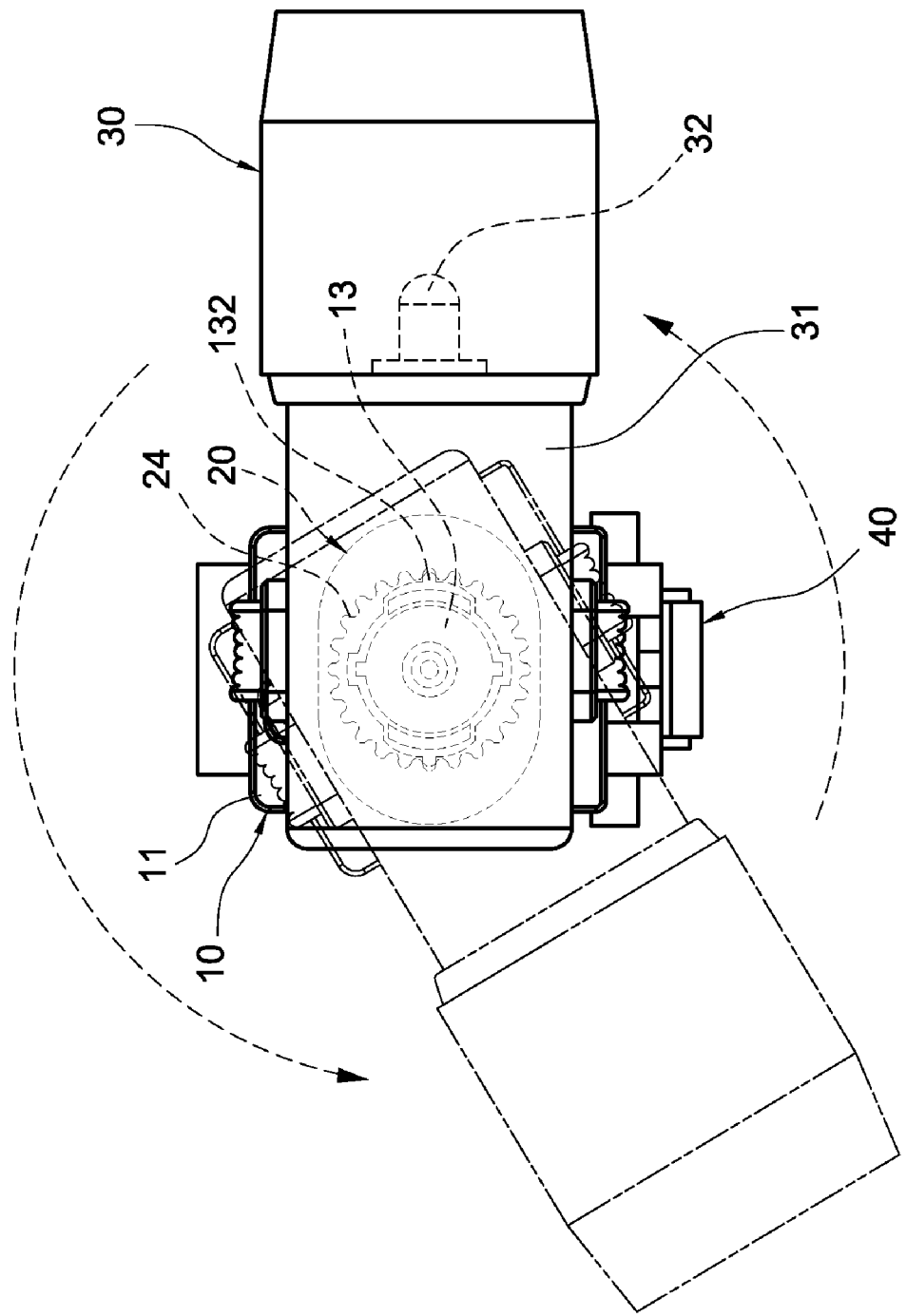
FIG. 3 is a top view of rotating a multi-functional lamp as depicted in FIG. 2.

With reference to FIG. 3, the light emitting module 30 is rotated with respect to the carrier module 10 through the rotating element 20, and the circular inner gear 24 is engaged with the outer gear 132, such that the light emitting module 30 is fixed at a specific position, and the illumination direction of the light emitting member 32 will not be shaken.

Figure 4:
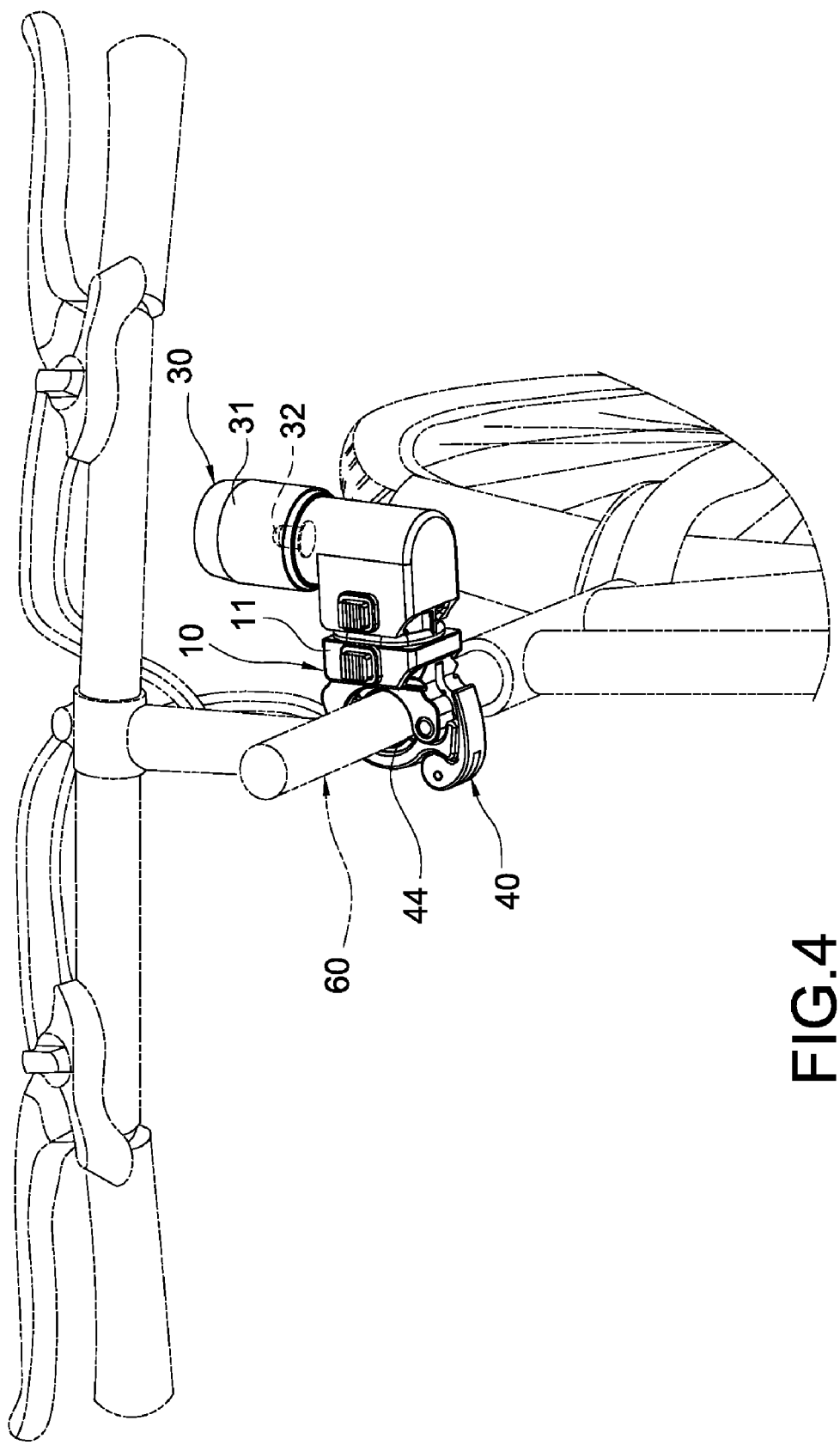
FIG. 4 is a schematic view of installing a multi-functional lamp onto a bicycle as depicted in FIG. 2.

With reference to FIG. 4, the multi-functional lamp is installed on a vertical rod 60 of a bicycle, and the vertical rod 60 is contained in the containing groove 44, and the compressing mechanism 40 is provided for tightly clamping the vertical rod 60, and the upper curved gear rack 412 and the lower curved gear rack 121 prevent the multi-functional lamp from sliding along the vertical rod 60, and the light emitting member 32 illuminates the front to provide a clear driving direction, and the light emitting module 30 can be turned downward, so that the light emitting member 32 illuminates the ground and allows riders to avoid pits or obstacles on a road surface.

Figure 5:
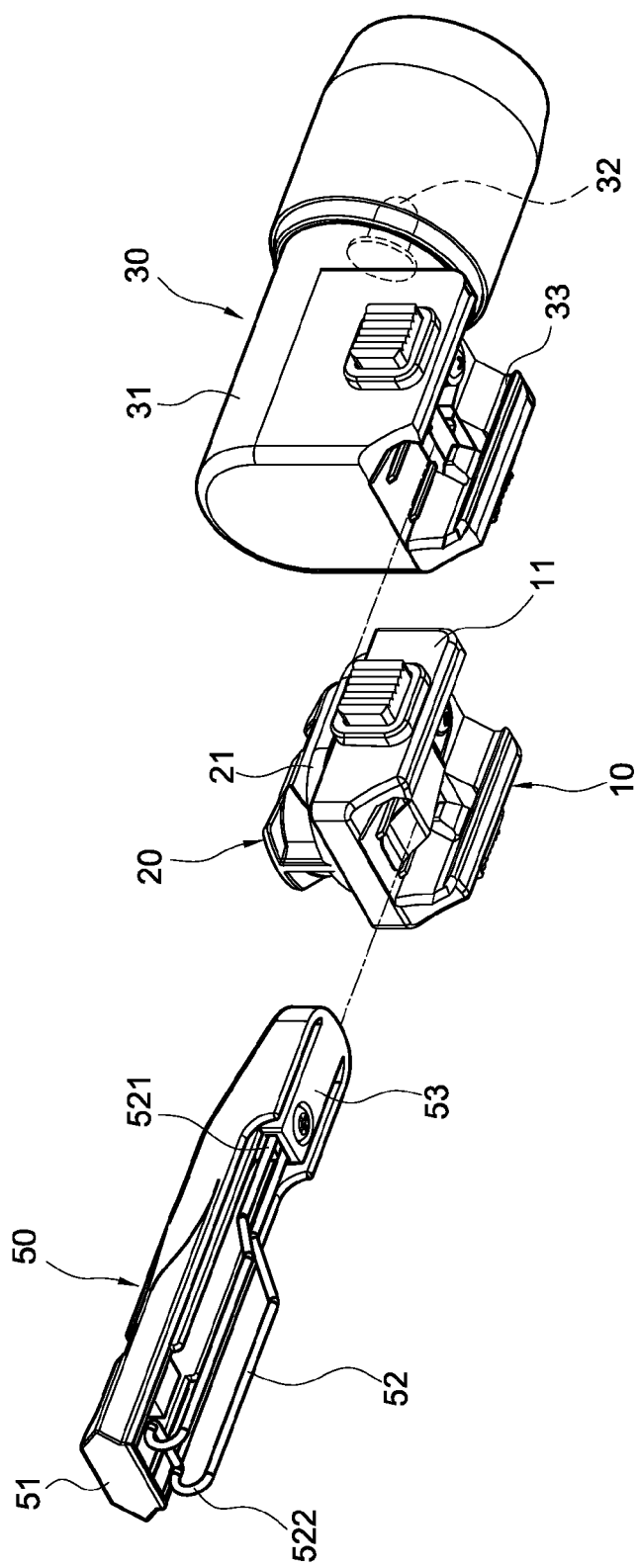
FIG. 5 is an exploded view of changing a carrier module as depicted in FIG. 2.
Figure 6:
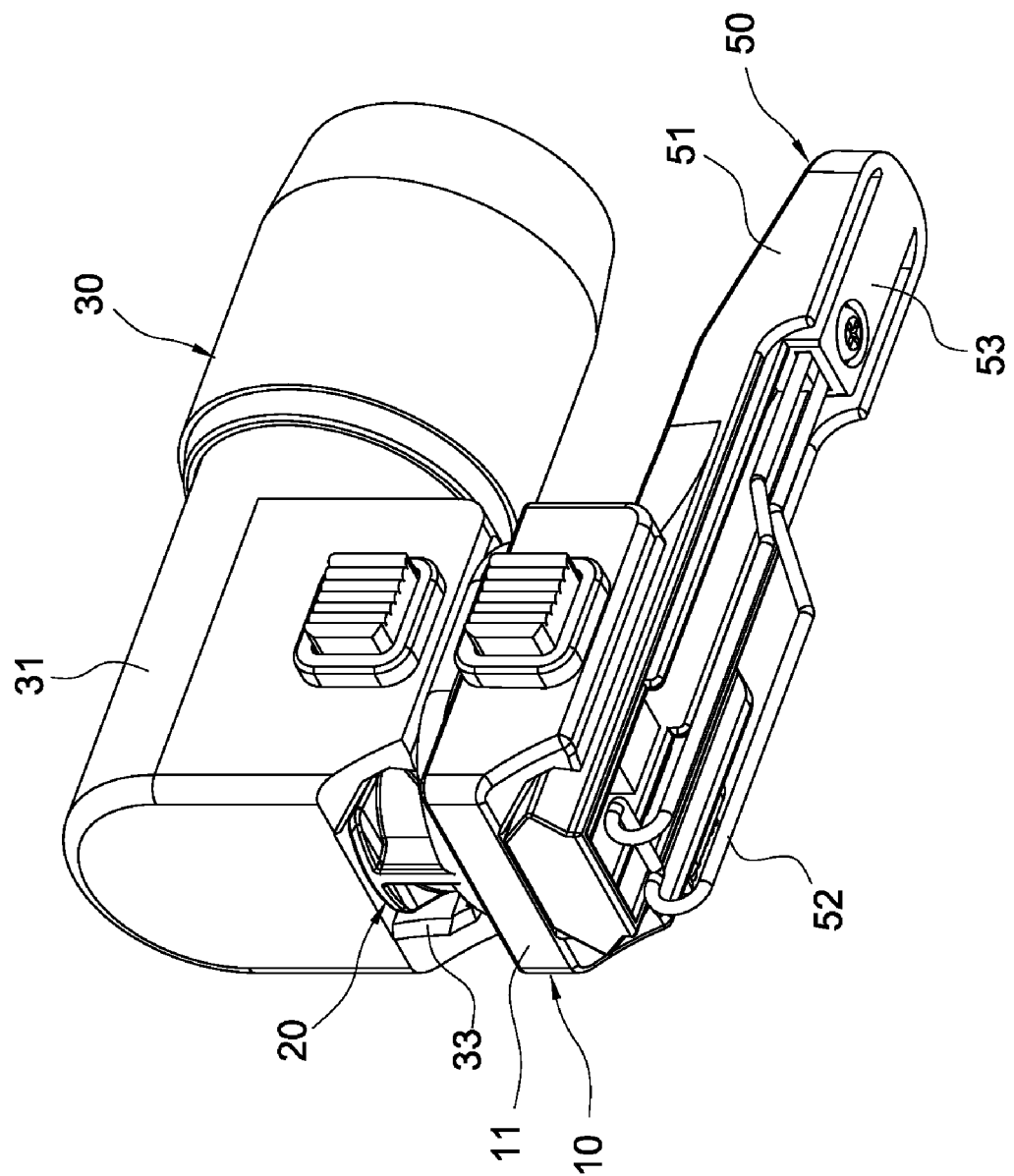
FIG. 6 is a perspective view of FIG. 5.

With reference to FIGS. 5 and 6, the multi-functional lamp further comprises an elastic clamp mechanism 50. Now, the curved arm 12 in the carrier module 10 is removed, and the elastic clamp mechanism 50 is coupled to the base 11 in the carrier module 10 by coupling the guide rail with the guide slot, and the elastic clamp mechanism 50 includes a block 51 coupled to the base 11, an elastic element 52 and a press plate 53, wherein an end of the elastic element 52 is a fixed end 521, and another end of the elastic element 52 includes an inverted winding hook 522, and the fixed end 521 is attached onto the block 51, and the press plate 53 is pressed against the fixed end 521, and the press plate 53 is coupled to the block 51 by a screw or any other locking method, and the winding hook 522 elastically abuts the bottom of the block 51.

Figure 7:
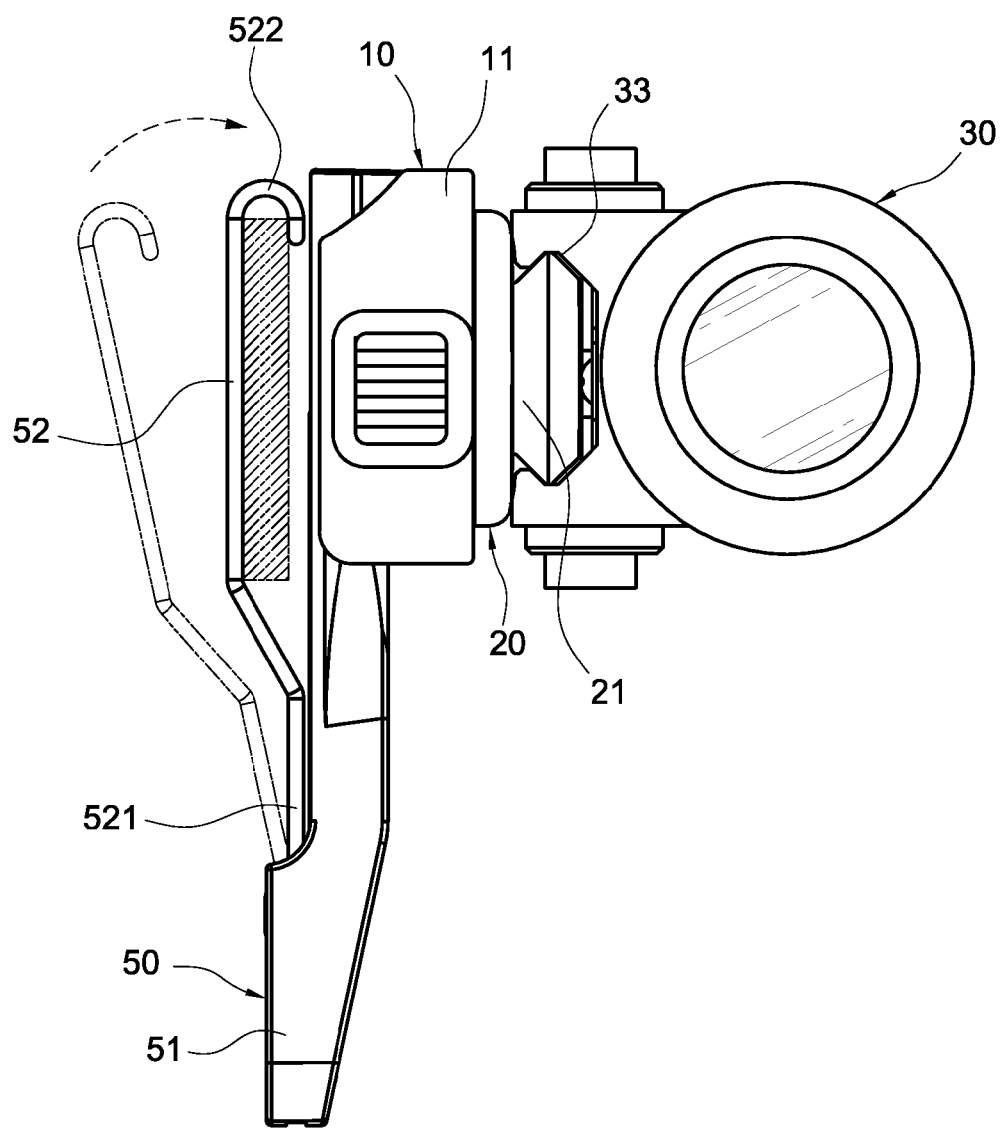
FIG. 7 is a side view of a clamping movement as depicted in FIG. 6.

With reference to FIG. 7, the elastic element 52 is made of an elastic material with high resilience, and the winding hook 522 can be lifted away from the bottom of the block 51. After the pulling force is released, the winding hook 522 will resume its original position.

Figure 8:
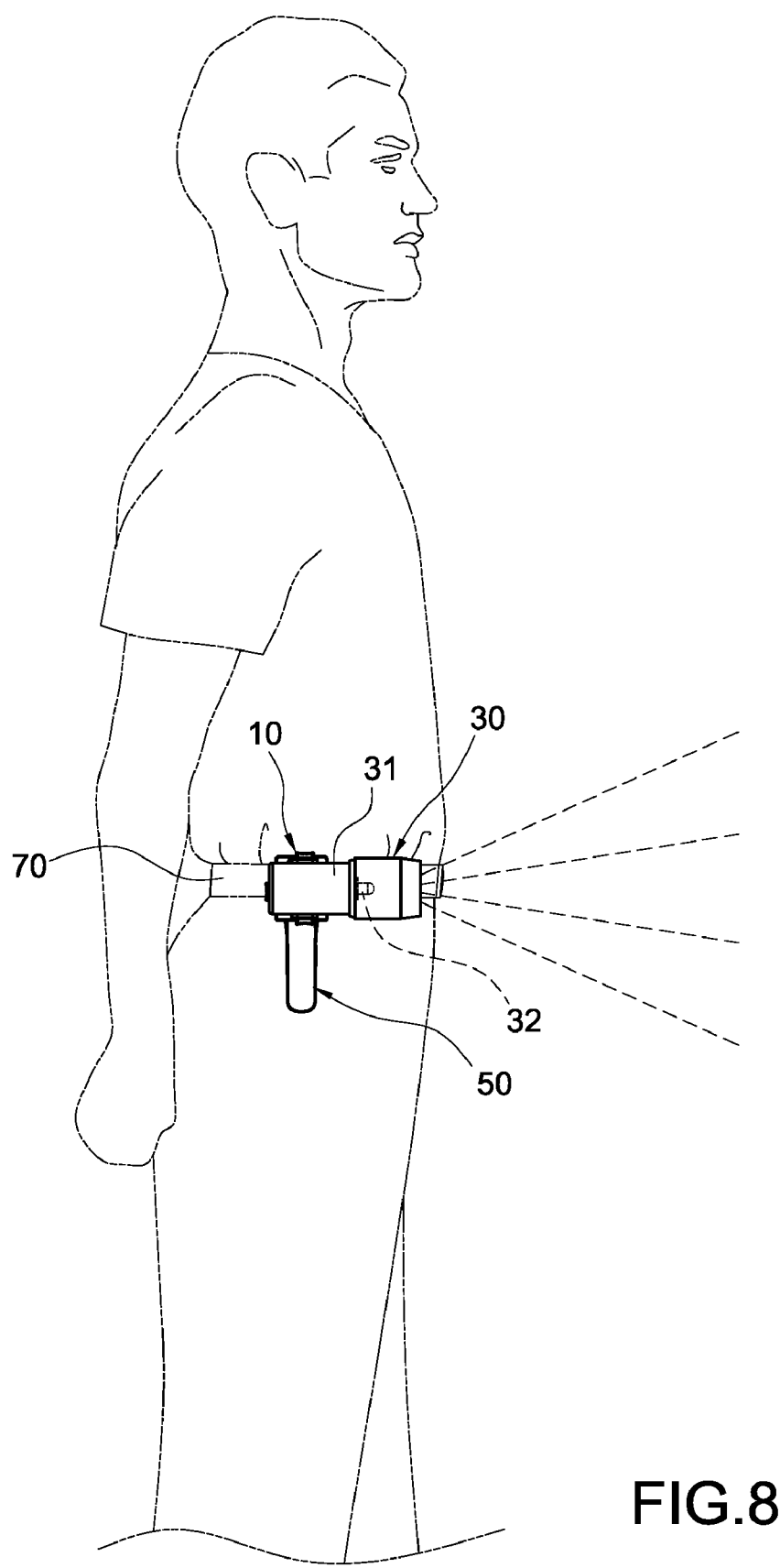
FIG. 8 is a schematic view of a multi-functional lamp worn on a pedestrian's body as depicted in FIG. 5.

With reference to FIG. 8, the multi-functional lamp is worn onto a waist belt 70 of a user, and the waist belt 70 is clamped at the elastic clamp mechanism 50, and the winding hook 522 is hung at the waist belt 70, and the light emitting member 32 is provided for illuminating the front to provide a clear driving direction, and the light emitting module 30 can be turned downward, such that the light emitting member 32 illuminates the ground to allow pedestrians to avoid pits or obstacles on a road surface, so as to prevent the pedestrians from tumbling or falling into a trap.

Figure 9:
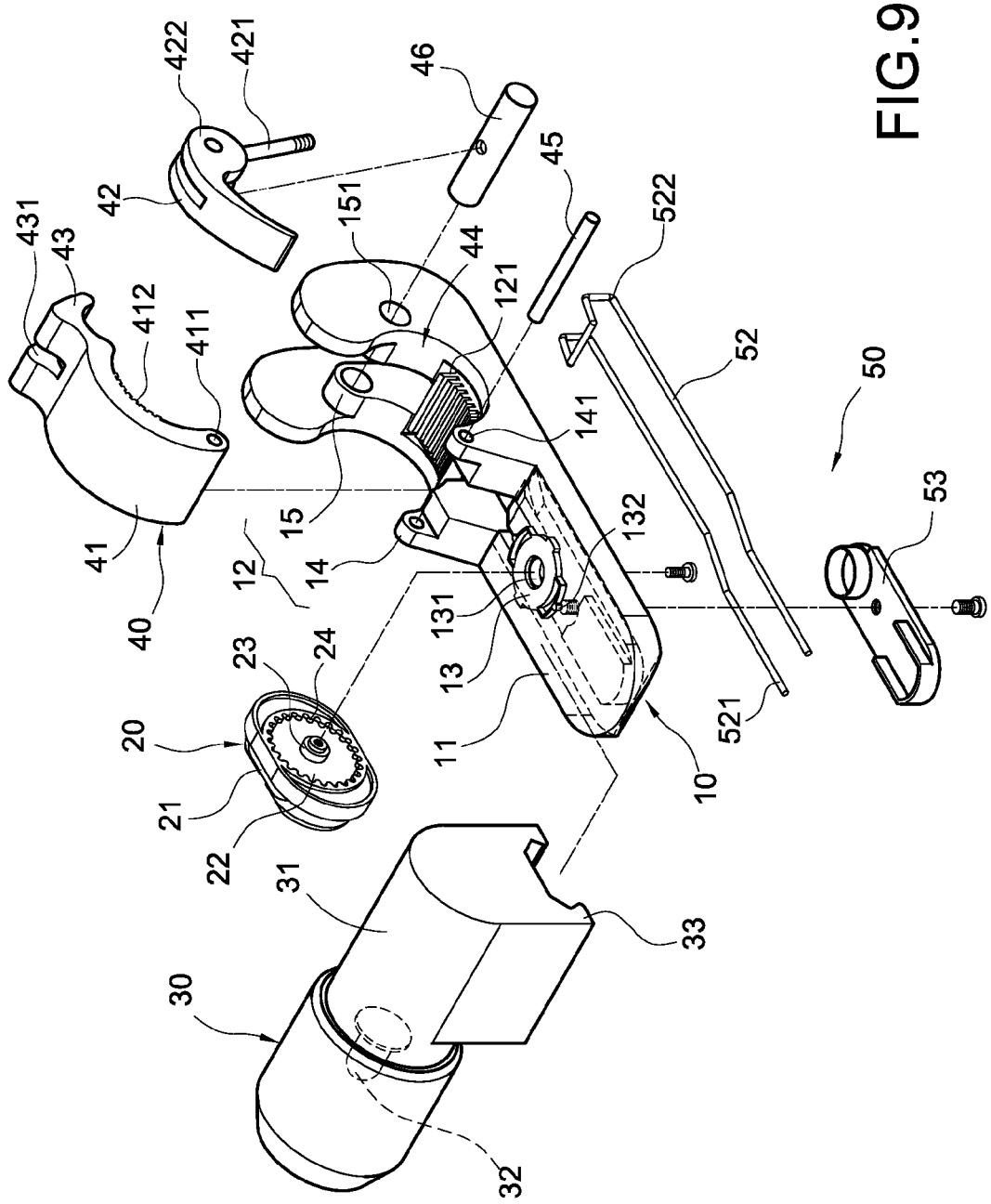
FIG. 9 is an exploded view of a second preferred embodiment of the present invention.
Figure 10:
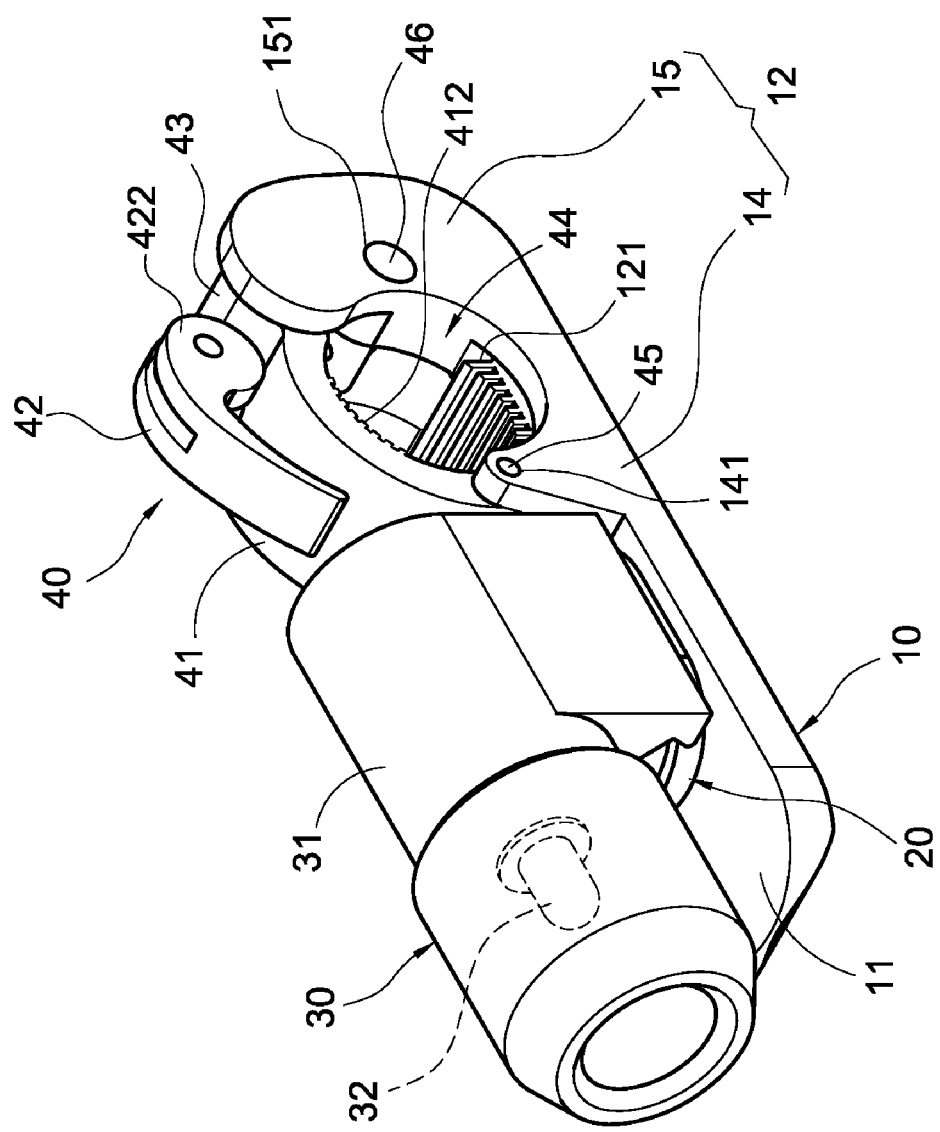
FIG. 10 is a perspective view of FIG. 9.

With reference to FIGS. 9 and 10 for a second preferred embodiment of the present invention, the multi-functional lamp comprises a carrier module 10, a rotating element 20, a light emitting module 30, a compressing mechanism 40 and an elastic clamp mechanism 50.

The carrier module 10 includes a base 11 and a curved arm 12 extended from an end of the base 11, wherein a shaft 13 is protruded from a surface of the base 11, and the shaft 13 has a shaft hole 131 formed thereon, and an outer gear 132 protruded from the periphery of the shaft 13, and the curved arm 12 includes a front arm 14 disposed proximate to the base 11 and a rear arm 15 disposed away from the base 11, and the front arm 14 has a front through hole 141, and the rear arm 15 has a rear through hole 151, and a lower curved gear rack 121 is protruded from the center of a surface of the curved arm 12.

The rotating element 20 includes a pair of guide rails 21 formed on both sides of the rotating element 20, an inner groove 22 concavely formed at the bottom of the rotating element 20, a cam shaft 23 protruded from a bottom side of the inner groove 22, and a circular inner gear 24 protruded from an internal periphery of the inner groove 22, wherein the rotating element 20 is pivotally coupled into the shaft hole 131 by the cam shaft 23, and the circular inner gear 24 is engaged with the outer gear 132, and the rotating element 20 is coupled onto the base 11 by a screw or any other locking method, such that the rotating element 20 will not be separated from the shaft 13.

The light emitting module 30 includes a body 31 and a light emitting member 32 installed at the body 31, and the body 31 includes a pair of guide slots 33 protruded from the bottom of the body 31 and latched with the pair of guide rails 21 respectively, such that the light emitting module 30 is fixed onto the rotating element 20.

The compressing mechanism 40 includes a rotating arm 41, a fastener module 42, a first pivot 45 and a second pivot 46, wherein the rotating arm 41 has a penetrating hole 411 formed at a front end of the rotating arm 41, and the rotating arm 41 is passed through and fixed into the front through hole 141 and the penetrating hole 411 by the first pivot 45, such that the rotating arm 41 is pivotally coupled to the front arm 14, and an upper curved gear rack 412 is protruded from an internal wall of the rotating arm 41, and a hook 43 is extended from a rear end of the rotating arm 41, and the hook 43 includes an embedding groove 431 formed at the center of the hook 43, and the hook 43 clamps the rear arm 15, such that the rotating arm 41 and the curved arm 12 can be enclosed to form a containing groove 44.

The fastener module 42 includes an embedded rod 421 coupled to the second pivot 46 and a quick release handle 422 coupled to the embedded rod 421, and the embedded rod 421 is coupled onto the second pivot 46 by a screw or any other locking method, and the fastener module 42 is passed through and coupled to the rear through hole 151 by the second pivot 46, such that the fastener module 42 is pivotally coupled to the rear arm 15, and the embedded rod 421 is embedded into the embedding groove 431, and the quick release handle 422 is pressed against the hook 43, such that the hook 43 abuts the rear arm 15 tightly.

The elastic clamp mechanism 50 includes an elastic element 52 and a press plate 53, wherein an end of the elastic element 52 is a fixed end 521, and another end of the elastic element 52 has an inverted winding hook 522 formed at the bottom of the curved arm 12, and the fixed end 521 is attached to the base 11, and the press plate 53 is pressed against the fixed end 521, and the press plate 53 is coupled onto the base 11 by a screw or any other locking method, and the winding hook 522 is elastically pressed against the bottom of the curved arm 12.

Figure 11:
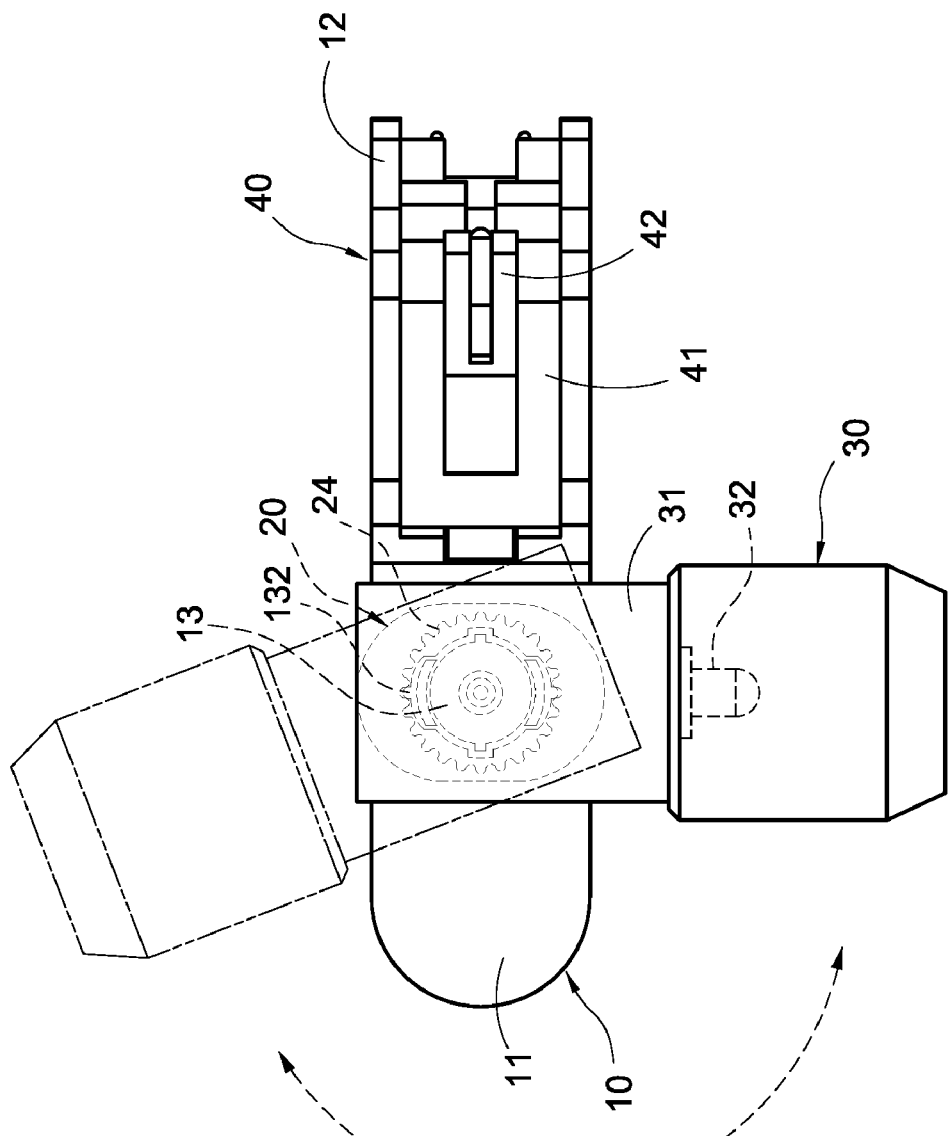
FIG. 11 is a top view of a rotating movement as depicted in FIG. 10.

With reference to FIG. 11, the light emitting module 30 is rotated with respect to the carrier module 10 through the rotating element 20, and the circular inner gear 24 is engaged with the outer gear 132, such that the light emitting module 30 is fixed at a specific position and the illumination direction of the light emitting member 32 will not be shaken.

Figure 12:
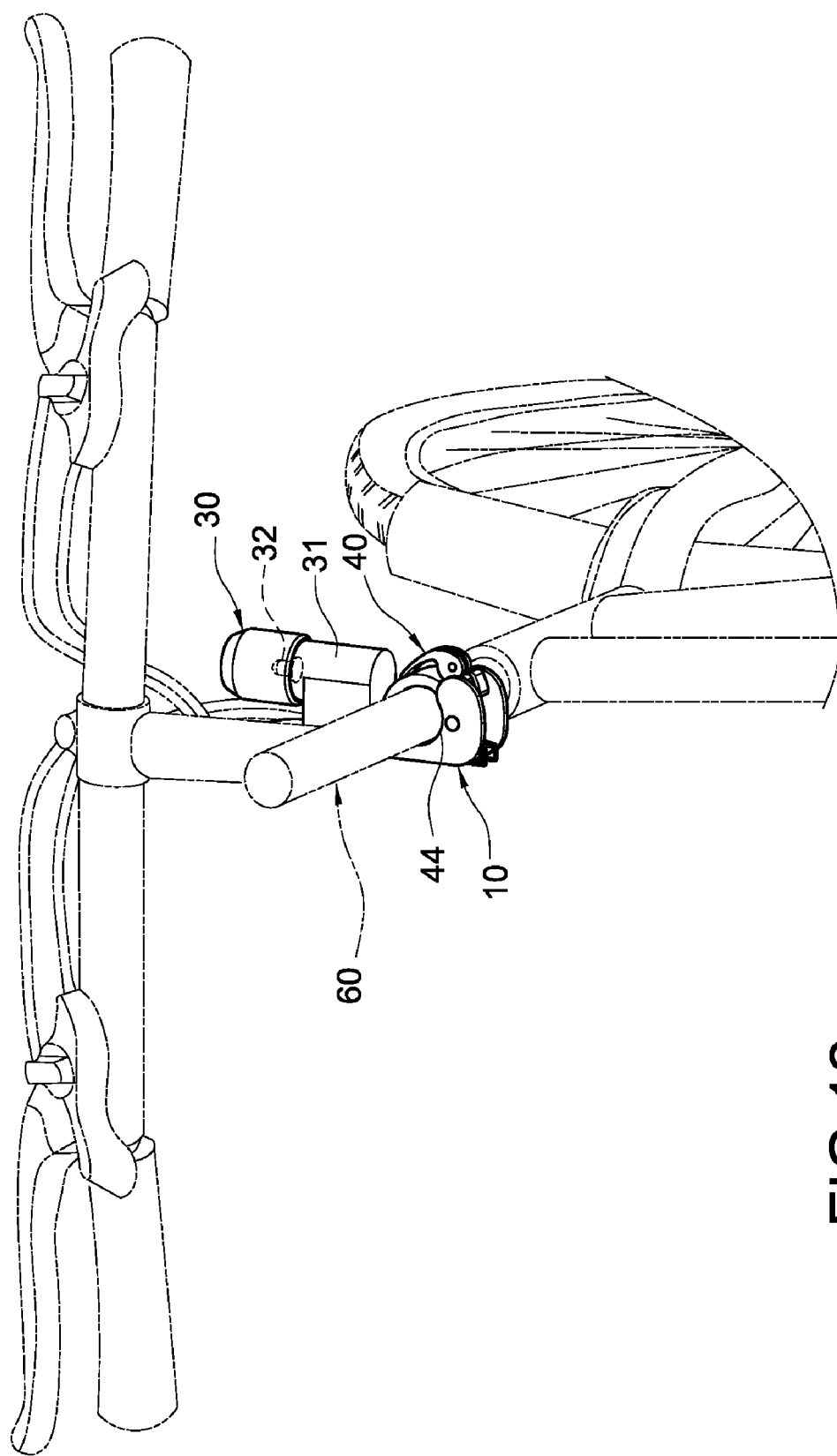
FIG. 12 is a schematic view of installing a multi-functional lamp onto a bicycle as depicted in FIG. 10.

With reference to FIG. 12, the multi-functional lamp is installed onto a vertical rod 60 of a bicycle, and the vertical rod 60 is contained in the containing groove 44, and the compressing mechanism 40 clamps the vertical rod 60 securely, and the upper curved gear rack 412 and the lower curved gear rack 121 can prevent the multi-functional lamp from sliding along the vertical rod 60, and the light emitting member 32 illuminates the front to provide a clear driving direction, and the light emitting module 30 can be turned downward, such that the light emitting member 32 illuminates the ground to allow riders to avoid pits or obstacles on a road surface.

Figure 13:
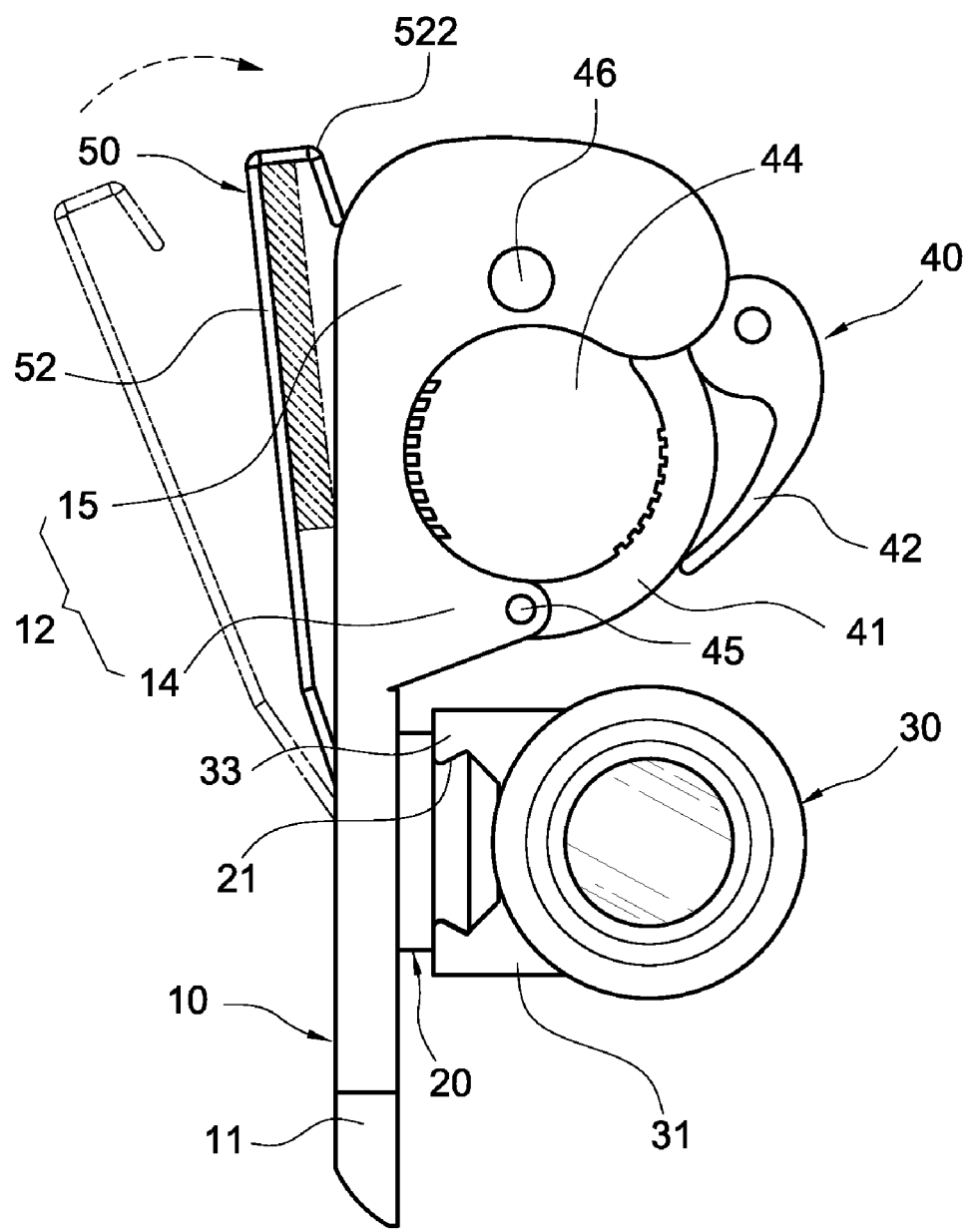
FIG. 13 is a side view of a clamping movement as depicted in FIG. 9.

With reference to FIG. 13, the elastic element 52 is made of an elastic material with high resilience, and the winding hook 522 can be lifted away from the bottom of the curved arm 12. After the pulling force is released, the winding hook 522 will resume its original position.

Figure 14:
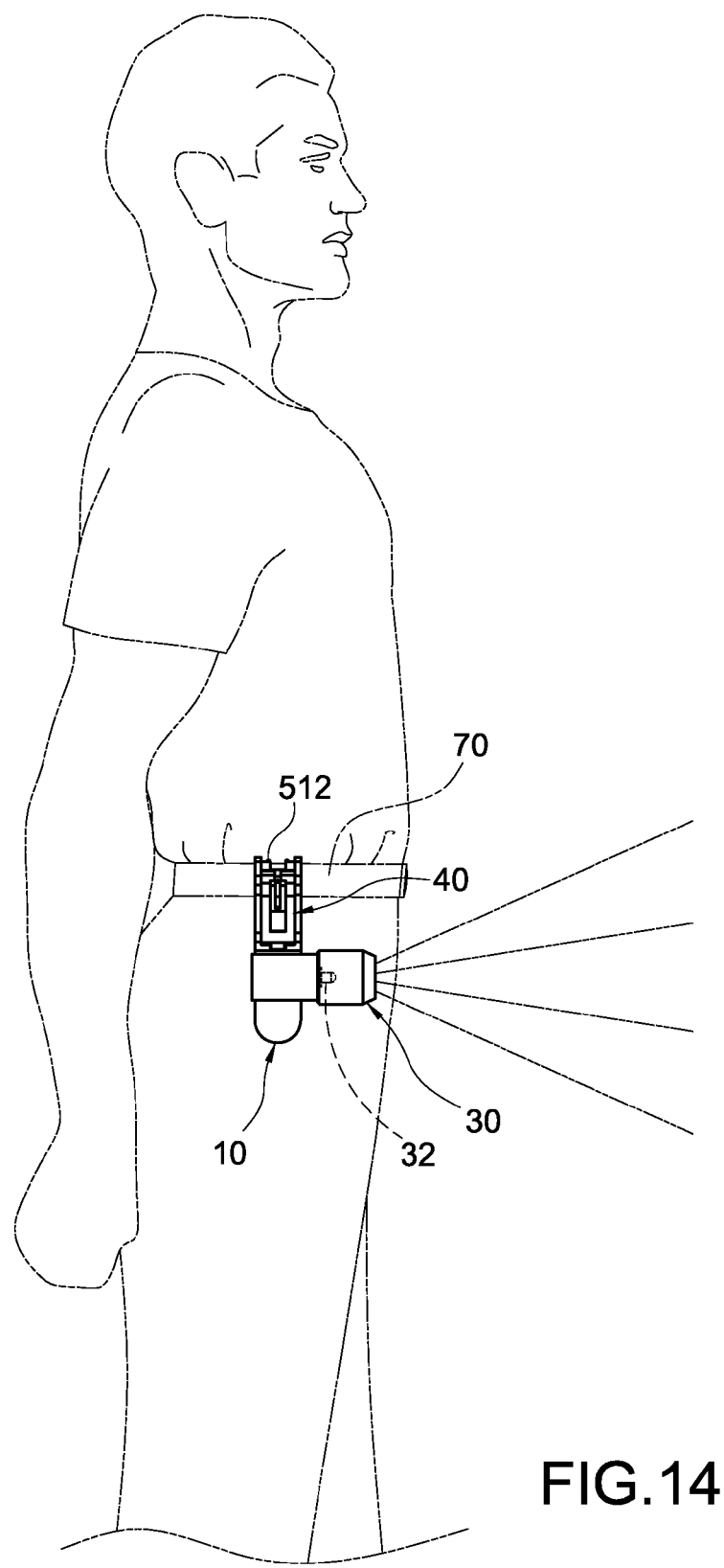
FIG. 14 is a schematic view of a multi-functional lamp worn on a pedestrian's body as depicted in FIG. 9.

With reference to FIG. 14, the multi-functional lamp is worn onto a waist belt 70 of a user, and the waist belt 70 is clamped between the carrier module 10 and the elastic clamp mechanism 50, and the winding hook 522 is hung at the waist belt 70, and the light emitting member 32 illuminates the front to provide a clear driving direction, and the light emitting module 30 can be turned downward, such that the light emitting member 32 illuminates the ground to allow pedestrians to avoid pits or obstacles on a road surface and prevent the pedestrian from tumbling or falling into a trap.

The present invention is illustrated with reference to the preferred embodiment and not intended to limit the patent scope of the present invention. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A multi-functional lamp, comprising:
  a carrier module, including a base and a curved arm coupled to a side of the base, and the base having a shaft formed thereon, and a front through hole and a rear through hole formed on the curved arm;
  a rotating element, including a cam shaft pivotally coupled to the shaft;
  a light emitting module, including a body coupled to the rotating element and a light emitting member installed at the body; and
  a compressing mechanism, including a rotating arm, a fastener module, a first pivot and a second pivot, and the first pivot being passing through the front through hole and coupled to the rotating arm, and the second pivot being passed through the rear through hole and coupled to the fastener module, and the fastener module being embedded and fixed into the rotating arm, and the rotating arm and the curved arm being enclosed to form a containing groove.

2. The multi-functional lamp of claim 1, wherein the rotating element includes an inner groove, and the cam shaft is formed at the inner groove, and the shaft includes a shaft hole for passing the cam shaft and pivotally coupling with the shaft hole.

3. The multi-functional lamp of claim 2, wherein the inner groove includes a circular inner gear formed on an internal wall of the inner groove, and the shaft includes an outer gear formed at the periphery of the shaft and engaged with the circular inner gear.

4. The multi-functional lamp of claim 1, wherein the rotating element includes a pair of guide rails formed on both sides of the rotating element respectively, and the body includes a pair of guide slots formed thereon and latched with the pair of guide slots respectively.

5. The multi-functional lamp of claim 1, wherein the curved arm includes a front arm, and the front through hole is formed at the front arm, and the rotating arm includes a penetrating hole, and the first pivot is passed through and coupled to the front through hole and the penetrating hole.

6. The multi-functional lamp of claim 1, wherein the curved arm includes a rear arm, and the rear through hole is formed at the rear arm, and the second pivot is passed through and coupled to the rear through hole, and the fastener module includes an embedded rod coupled to the second pivot and a quick release handle coupled to the embedded rod.

7. The multi-functional lamp of claim 6, wherein the rotating arm includes a hook formed at a rear end of the rotating arm, and the hook includes an embedding groove for embedding the embedded rod, and the quick release handle is pressed against the hook.

8. The multi-functional lamp of claim 1, wherein the rotating arm includes an upper curved gear rack, and the curved arm includes a lower curved gear rack, and both of the upper curved gear rack and the lower curved gear rack are formed in the containing groove.

9. The multi-functional lamp of claim 1, further comprising an elastic clamp mechanism, and the elastic clamp mechanism including a block and an elastic element coupled to the base, and an end of the elastic element being fixed to the block, and another end of the elastic element being elastically pressed against the block.

10. The multi-functional lamp of claim 1, further comprising an elastic clamp mechanism, and the elastic clamp mechanism including an elastic element, and an end of the elastic element being fixed to the base and another end elastically abutting against the curved arm.

* * * * *